(12) United States Patent
Torigoshi et al.

(10) Patent No.: US 10,367,970 B2
(45) Date of Patent: Jul. 30, 2019

(54) IMAGE FORMING APPARATUS, RECORDING MEDIUM, AND IMAGE FORMING SYSTEM

(71) Applicant: Konica Minolta, Inc., Chiyoda-ku, Tokyo (JP)

(72) Inventors: Akihiro Torigoshi, Itami (JP); Junichi Hase, Osaka (JP); Takeshi Minami, Amagasaki (JP); Tomoaki Nakajima, Kobe (JP); Nobuhiro Mishima, Osaka (JP); Yuji Tanaka, Amagasaki (JP); Daisuke Nakano, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/710,240

(22) Filed: Sep. 20, 2017

(65) Prior Publication Data

US 2018/0084144 A1     Mar. 22, 2018

(30) Foreign Application Priority Data

Sep. 21, 2016   (JP) ................................ 2016-184112

(51) Int. Cl.
*G06F 3/12*         (2006.01)
*H04N 1/327*        (2006.01)
(Continued)

(52) U.S. Cl.
CPC ....... *H04N 1/32797* (2013.01); *G06F 3/1231* (2013.01); *H04N 1/00214* (2013.01);
(Continued)

(58) Field of Classification Search
CPC . G06F 3/1231; G06F 3/1292; H04N 1/00214; H04N 1/32797; H04N 1/333; H04W 72/02
(Continued)

(56) References Cited

U.S. PATENT DOCUMENTS 8,254,296 B1   8/2012  Lambert et al.
9,122,429 B1*  9/2015  Cecile ................... G06F 3/1204
(Continued)

FOREIGN PATENT DOCUMENTS

JP   2003-099211 A   4/2003
JP   2003-244159 A   8/2003
(Continued)

OTHER PUBLICATIONS

Extended European Search Report dated Feb. 8, 2018, issued by the European Patent Office in corresponding European Application No. 17191828.7. (10 pages).

*Primary Examiner* — Negussie Worku
(74) *Attorney, Agent, or Firm* — Buchanan Ingersoll & Rooney PC

(57) ABSTRACT

An image forming apparatus includes a communication interface capable of communication over a plurality of frequency bands and a controller configured to determine whether the content of communication of the communication interface satisfies a predetermined condition. The controller is configured to execute control for switching the frequency band of communication via the communication interface to another frequency band over the frequency bands when the content of communication of the communication interface satisfies a predetermined condition.

18 Claims, 16 Drawing Sheets

(51) Int. Cl.
  *H04W 72/02*  (2009.01)
  *H04N 1/00*   (2006.01)
  *H04N 1/333*  (2006.01)

(52) U.S. Cl.
  CPC ............ *H04N 1/333* (2013.01); *H04W 72/02* (2013.01); *G06F 3/1292* (2013.01)

(58) Field of Classification Search
  USPC ....................................................... 358/1.15
  See application file for complete search history.

(56) References Cited

U.S. PATENT DOCUMENTS

| | | | |
|---|---|---|---|
| 9,294,790 B2* | 3/2016 | Yamagishi | H04N 21/2385 |
| 2009/0224855 A1* | 9/2009 | Yamao | H01P 1/203 |
| | | | 333/202 |
| 2009/0232098 A1* | 9/2009 | Makabe | H04W 36/00835 |
| | | | 370/332 |
| 2009/0238093 A1 | 9/2009 | Saneto | |
| 2012/0147777 A1* | 6/2012 | Arashin | H04W 72/02 |
| | | | 370/252 |
| 2013/0225093 A1* | 8/2013 | Murakami | H04B 1/005 |
| | | | 455/71 |
| 2013/0231051 A1* | 9/2013 | Naruse | G06F 3/1204 |
| | | | 455/41.2 |
| 2013/0294358 A1* | 11/2013 | Kim | H04W 72/12 |
| | | | 370/329 |
| 2015/0205550 A1* | 7/2015 | Lee | G06F 3/1204 |
| | | | 358/1.15 |
| 2016/0073377 A1* | 3/2016 | Nagara | H04W 72/02 |
| | | | 455/455 |
| 2016/0127575 A1* | 5/2016 | Kitao | H04N 1/00106 |
| | | | 358/1.15 |
| 2016/0219606 A1 | 7/2016 | Amano et al. | |
| 2017/0026889 A1* | 1/2017 | Tsuda | H04W 52/0206 |
| 2017/0055089 A1* | 2/2017 | Pedersen | H04R 25/554 |
| 2017/0192725 A1* | 7/2017 | Choi | G06F 3/1204 |
| 2018/0063368 A1* | 3/2018 | Ito | G06F 3/1292 |
| 2018/0368041 A1* | 12/2018 | Tsuda | H04W 52/0206 |

FOREIGN PATENT DOCUMENTS

| | | |
|---|---|---|
| JP | 2010-239449 A | 10/2010 |
| JP | 2012-010316 A | 1/2012 |
| JP | 2015-210597 A | 11/2015 |

* cited by examiner

FIG.3

| | SSID | CONNECTING TERMINAL ID |
|---|---|---|
| 2.4GHz | MFP1-SSID-01 | PORTABLE TERMINAL 100B |
| | | UNCONNECTED |
| | | UNCONNECTED |
| | | UNCONNECTED |
| | | UNCONNECTED |
| 5GHz | MFP1-SSID-02 | PORTABLE TERMINAL 100A |
| | | PORTABLE TERMINAL 100 |
| | | UNCONNECTED |
| | | UNCONNECTED |
| | | UNCONNECTED |

FIG.7

NUMBER OF SIMULTANEOUS CONNECTION
2.4GHz: FIVE DEVICES  5GHz: FIVE DEVICES

|  | SSID | CONNECTING TERMINAL ID |
|---|---|---|
| 2.4GHz | MFP1-SSID-01 | PORTABLE TERMINAL 100B |
|  |  | PORTABLE TERMINAL 100 |
|  |  | UNCONNECTED |
|  |  | UNCONNECTED |
|  |  | UNCONNECTED |
| 5GHz | MFP1-SSID-02 | PORTABLE TERMINAL 100A |
|  |  | UNCONNECTED |
|  |  | UNCONNECTED |
|  |  | UNCONNECTED |
|  |  | UNCONNECTED |

FIG.9

NUMBER OF SIMULTANEOUS CONNECTION
2.4GHz:FIVE DEVICES  5GHz:FIVE DEVICES

|  | SSID | CONNECTION STATE |
|---|---|---|
| 2.4GHz | MFP1-SSID-01 | CONNECTING-PORTABLE TERMINAL 100A |
|  | MFP1-SSID-02 | UNCONNECTED |
|  | MFP1-SSID-03 | UNCONNECTED |
|  | MFP1-SSID-04 | UNCONNECTED |
|  | MFP1-SSID-05 | UNCONNECTED |
| 5GHz | MFP1-SSID-06 | CONNECTING-PORTABLE TERMINAL 100 |
|  | MFP1-SSID-07 | UNCONNECTED |
|  | MFP1-SSID-08 | UNCONNECTED |
|  | MFP1-SSID-09 | UNCONNECTED |
|  | MFP1-SSID-10 | UNCONNECTED |

FIG.10
NUMBER OF SIMULTANEOUS CONNECTION
2.4GHz: FIVE DEVICES  5GHz: FIVE DEVICES

|  | SSID | CONNECTION STATE |  |
|---|---|---|---|
| 2.4GHz | MFP1-SSID-01 | CONNECTING-PORTABLE TERMINAL100A | |
|  | MFP1-SSID-06 | CONNECTING-PORTABLE TERMINAL100 | |
|  | MFP1-SSID-03 | UNCONNECTED | |
|  | MFP1-SSID-04 | UNCONNECTED | CHANGE |
|  | MFP1-SSID-05 | UNCONNECTED | |
| 5GHz | MFP1-SSID-11 | UNCONNECTED | |
|  | MFP1-SSID-07 | UNCONNECTED | |
|  | MFP1-SSID-08 | UNCONNECTED | |
|  | MFP1-SSID-09 | UNCONNECTED | |
|  | MFP1-SSID-10 | UNCONNECTED | |

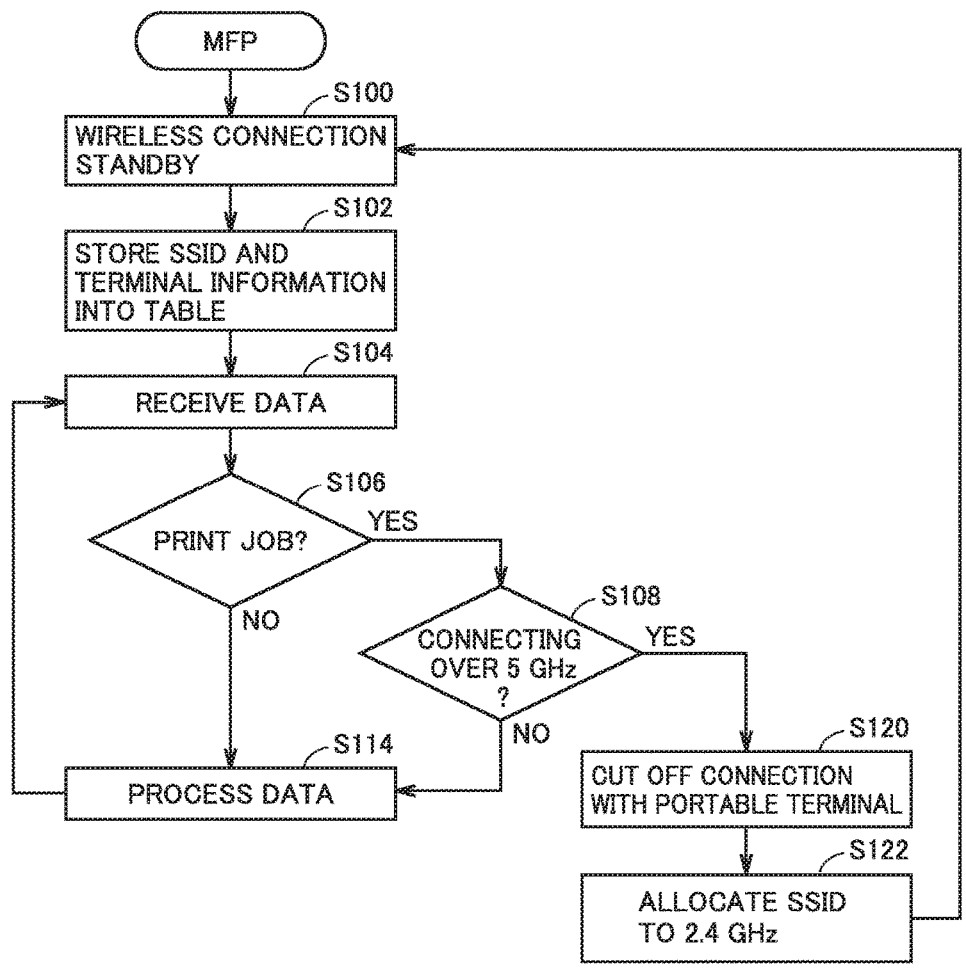

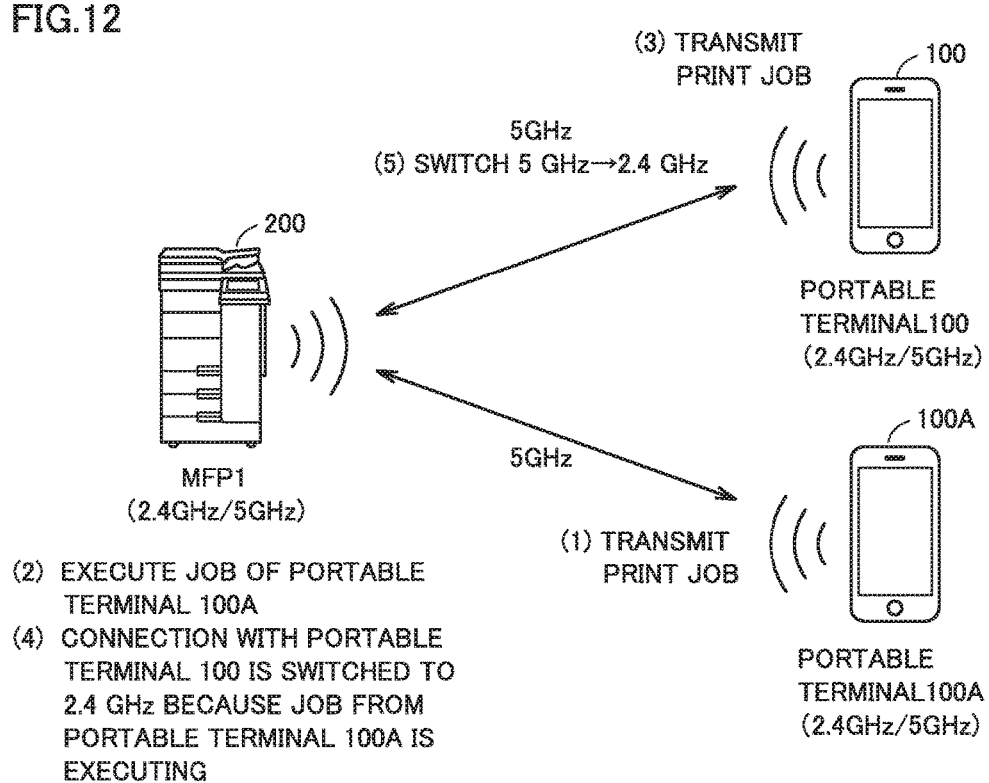

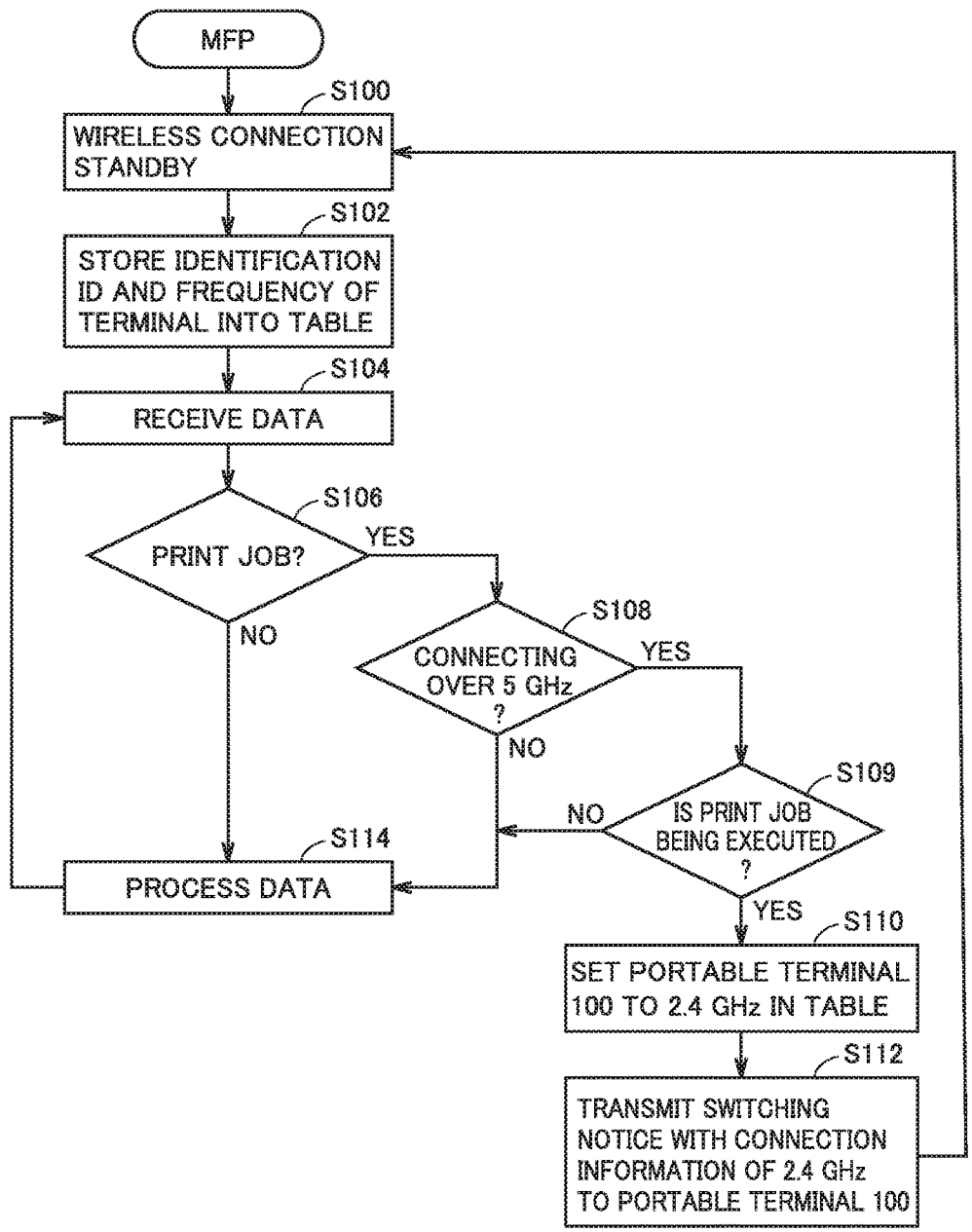

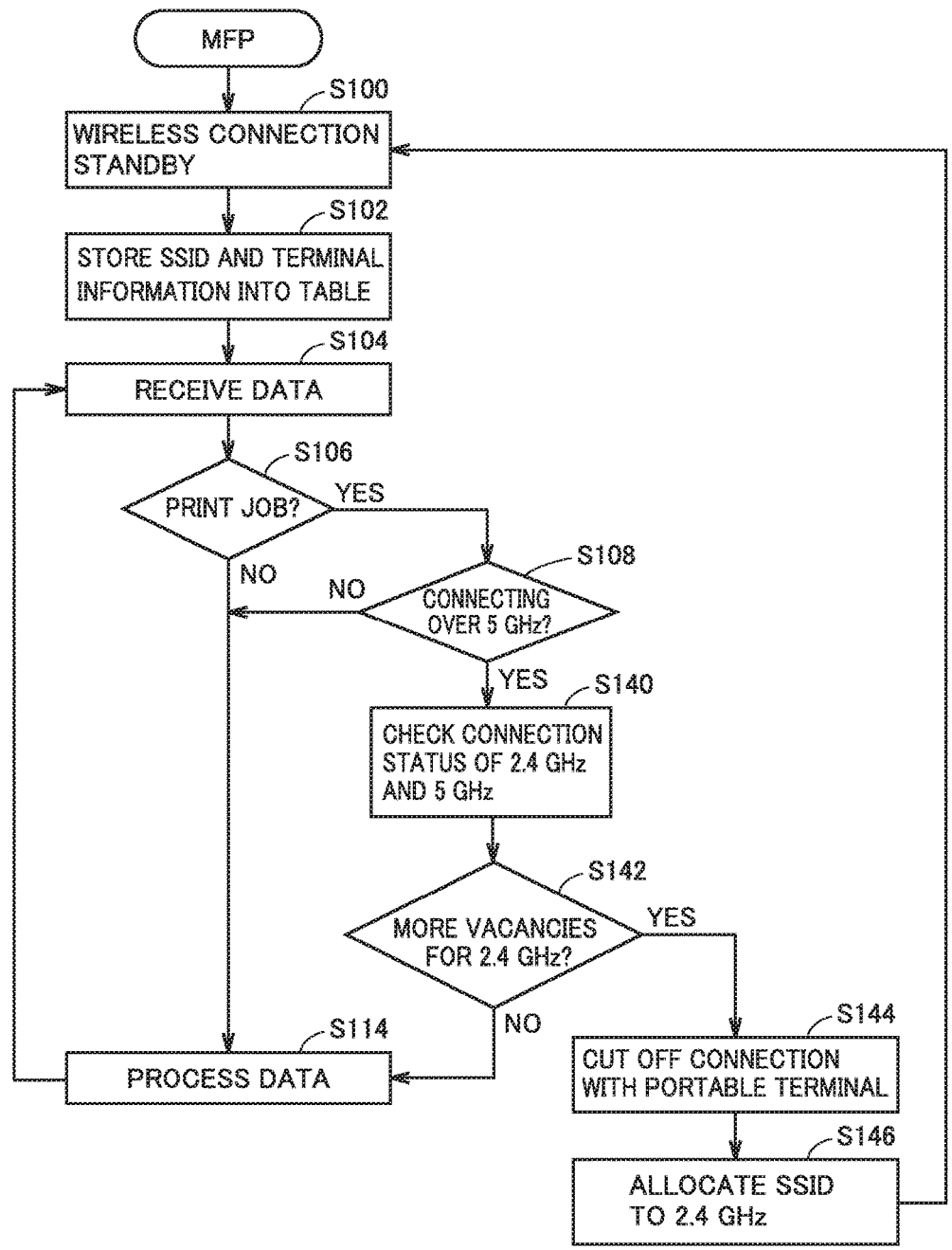

ically, some image forming apparatuses such as MFPs (Multi-Functional Peripherals) communicate with information processing apparatuses via plurality of modes such as a plurality of standards (for example, WiFi (Wireless Fidelity) and NFC (Near Field Communication)), a plurality of channels, a plurality of interfaces (for example, IrDA (Infrared Data Association) and Bluetooth (registered trademark)), or a plurality of frequency bands (for example, the 2.4 GHz band and the 5 GHz band). A variety of techniques have been proposed for such image forming apparatuses.

IMAGE FORMING APPARATUS, RECORDING MEDIUM, AND IMAGE FORMING SYSTEM

Japanese Patent Application No. 2016-184112 filed on Sep. 21, 2016 including description, claims, drawings, and abstract the entire disclosure is incorporated herein by reference in its entirety.

BACKGROUND

Technological Field

The present disclosure relates to an image forming apparatus capable of communication over a plurality of different frequency bands and an image forming system including such an image forming apparatus.

Description of the Related Art

Conventionally, some image forming apparatuses such as MFPs (Multi-Functional Peripherals) communicate with information processing apparatuses via plurality of modes such as a plurality of standards (for example, WiFi (Wireless Fidelity) and NFC (Near Field Communication)), a plurality of channels, a plurality of interfaces (for example, IrDA (Infrared Data Association) and Bluetooth (registered trademark)), or a plurality of frequency bands (for example, the 2.4 GHz band and the 5 GHz band). A variety of techniques have been proposed for such image forming apparatuses.

For example, Japanese Laid-Open Patent Publication No. 2015-210597 discloses that an information processing apparatus acquires connection information for communicating with an image processing apparatus via first wireless communication in accordance with a first wireless communication standard, via second wireless communication in accordance with a second wireless communication standard. The information processing apparatus further transmits print data via the first wireless communication to the image processing apparatus, and deletes the connection information after the print data has been transmitted to the image processing apparatus.

Japanese Laid-Open Patent Publication No. 2010-239449 discloses an image transmission system including an image processing apparatus and a relay communication apparatus that perform wireless communication. In the image transmission system, when wireless communication is interrupted, the image processing apparatus and the relay communication apparatus switch the channel in which the communication is performed into another channel to maintain the connection, determine whether the connection with the original channel can be resumed every predetermined periods, and return to the original state.

Japanese Laid-Open Patent Publication No. 2003-099211 discloses communication between a printer and a host computer. More specifically, the printer can communicate with the host computer via a plurality of interfaces (the IrDA mode and the Bluetooth mode) and switches the communication interfaces depending on a communication condition (radio wave condition).

The quality of communication may vary among a plurality of communication modes. For example, when communication over the 2.4 GHz band is compared with communication over the 5 GHz band, wave interference occurs less in the communication over the 5 GHz band. This means that communication over the 5 GHz band is more stable than communication over the 2.4 GHz band. The communication speed may also vary among a plurality of communication modes. For example, the communication speed in the 5 GHz band is generally higher than the communication speed in the 2.4 GHz band.

Considering such differences in quality and speed of communication as described above, users prefer communication over 5 GHz to 2.4 GHz. Meanwhile, the number of simultaneous communication in each communication band is restricted in some cases. Then, in an image forming apparatus capable of communication over a plurality of communication bands, it is requested to adjust the number of connected devices for each frequency band.

SUMMARY

To achieve at least one of the abovementioned objects, according to an aspect of the present disclosure, an image forming apparatus reflecting one aspect of the present invention comprises a communication interface capable of communication over a plurality of frequency bands and a controller configured to determine whether content of communication of the communication interface satisfies a predetermined condition. The controller is configured to execute control for switching a frequency band of communication by the communication interface to another frequency band of the frequency bands when the content of communication of the communication interface satisfies the condition.

According to another aspect of the present disclosure, a non-transitory recording medium is provided which is encoded with a program executed by a computer of an image forming apparatus including a communication interface capable of communication over a plurality of frequency bands. The program causes the computer to execute the steps of: allowing the communication interface to execute communication with a communication partner over one frequency band of the frequency bands; determining whether content of communication with the communication partner satisfies a predetermined condition; and when content of communication of the communication interface satisfies the condition, executing control for switching a frequency band of communication with the communication partner to another frequency band of the frequency bands.

According to a further aspect of the present disclosure, an image forming system comprises an information terminal and an image forming apparatus configured to communicate with the information terminal. The image forming apparatus includes a first communication interface capable of communication over a plurality of frequency bands and a first controller configured to determine whether content of communication with the information terminal by the first communication interface satisfies a predetermined condition. The first controller is configured to give a notice of switching of a frequency band of communication to the information terminal when content of communication of the communication interface satisfies the condition. The information terminal includes a second communication interface capable of communication over a plurality of frequency bands and a second controller configured to control communication of the second communication interface. The second controller is configured to allow the second communication interface to communicate with the first communication interface over another frequency band in response to receiving the notice from the image forming apparatus.

BRIEF DESCRIPTION OF THE DRAWINGS

The advantages and features provided by one or more embodiments of the invention will become more fully

FIG. 3 is a diagram showing an example of information for managing communication partners with the communication device of the MFP.

FIG. 7 is a diagram for explaining an example of changing the contents of a management table.

FIG. 9 is a diagram for explaining changing allocation of SSIDs (Service Set Identifiers) in the MFP.

FIG. 10 is a diagram for explaining changing allocation of SSIDs in the MFP.

FIG. 11 is a flowchart of the process executed in the process sequence including changing allocation of SSIDs.

FIG. 12 is a diagram showing an example of the process sequence in the image forming system.

FIG. 13 is a flowchart of the process executed in the process sequence (FIG. 12) including changing the frequency band in accordance with the state of the MFP.

FIG. 16 is a flowchart of an example of the process executed in the MFP in the image forming system.

DETAILED DESCRIPTION OF EMBODIMENTS

Hereinafter, one or more embodiments of the present invention will be described with reference to the drawings. However, the scope of the invention is not limited to the disclosed embodiments. In the following description, the same parts or components are denoted with the same signs. Their names and functions are also the same, and a description thereof will not be repeated.

<Overview of Disclosure>

Figure 1:
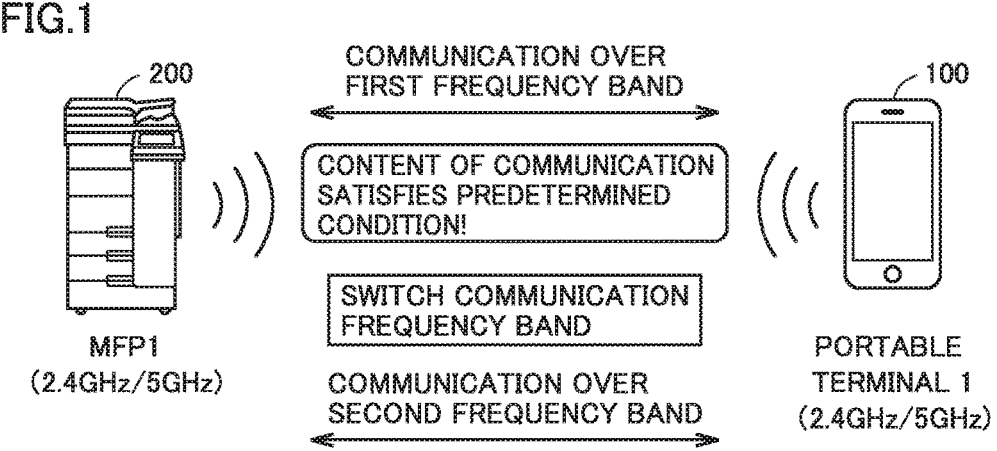
FIG. 1 is a diagram for explaining the overview of an image forming system according to the present disclosure.

FIG. 1 is a diagram for explaining the overview of an image forming system according to the present disclosure. As shown in FIG. 1, the image forming system includes a portable terminal 100 that is an example of the information terminal and an MFP 200 that is an example of the image forming apparatus. Portable terminal 100 and MFP 200 each can communicate over a plurality of frequency bands.

A plurality of frequency bands include the 2.4 GHz band and the 5 GHz band. These frequency bands are used, for example, in a plurality of standards of wireless LANs (Local Area Networks). In the present description, the 2.4 GHz band may be simply referred to as "2.4 GHz" and the 5 GHz band may be simply referred to as "5 GHz".

In the image forming system, portable terminal 100 and MFP 200 start communication over a first frequency band of a plurality of frequency bands. MFP 200 determines whether the content of communication (data received in communication) with portable terminal 100 satisfies a predetermined condition. An example of the predetermined condition is that data transmitted from portable terminal 100 to MFP 200 includes a print job.

If it is determined that the content of communication satisfies the predetermined condition, MFP 200 executes control for switching the frequency band of communication. This control allows MFP 200 to temporarily disconnect communication with portable terminal 100. Portable terminal 100 thereafter starts communication with MFP 200 over another frequency band.

<Hardware Configuration>

Figure 2:
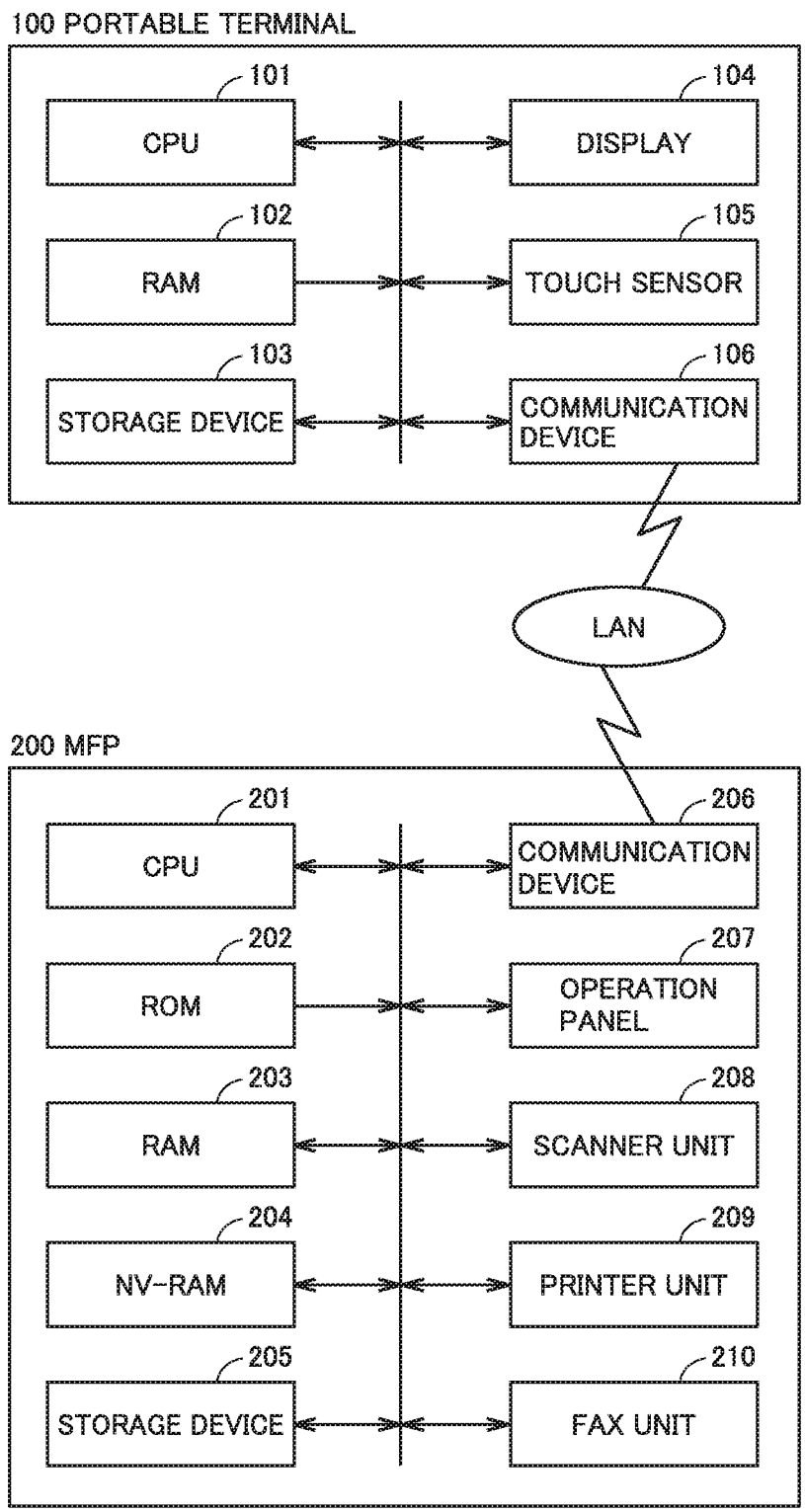
FIG. 2 is a diagram showing an example of the hardware configuration of a portable terminal and an MFP included in the image forming system.

FIG. 2 is a diagram showing an example of the hardware configuration of portable terminal 100 and MFP 200 included in the image forming system. The hardware configuration will be described below for each of portable terminal 100 and MFP 200.

(Portable Terminal 100)

As shown in FIG. 2, portable terminal 100 includes, as main components, a CPU (Central Processing Unit) 101, a RAM (Random Access Memory) 102, a storage device 103, a display 104, a touch sensor 105, and a communication device (communication interface) 106. CPU 101 is an example of the controller. CPU 101, RAM 102, storage device 103, display 104, touch sensor 105, and communication device 106 are connected with each other through an internal bus.

CPU is an example of the arithmetic device that executes processing for controlling the overall operation of portable terminal 100.

RAM 102 functions as a work area during execution of processing in CPU 101. Storage device 103 stores a variety of data, including a variety of programs such as an OS (Operating System) and a Web browser application executed by CPU 101 and data used for execution of these programs. Storage device 103 is a non-transitory recording medium, and is, for example, an EEPROM (Electronically Erasable Programmable Read-Only Memory).

Portable terminal 100 may not be portable as long as it has a communication function. Examples of storage device 103 include, in addition to the example above, CD-ROM (Compact Disc-Read Only Memory), DVD-ROM (Digital Versatile Disk-Read Only Memory), USB (Universal Serial Bus) memory, memory card, FD (Flexible Disk), hard disk, SSD (Solid State Drive), magnetic tape, cassette tape, MO (Magnetic Optical Disc), MD (Mini Disc). IC (Integrated Circuit) card (excluding memory card), optical card, and nonvolatile media such as mask ROM and EPROM. A program downloaded via a network may be installed in storage device 103. Storage device 103 may be a recording medium removable from portable terminal 100 and subject to commercial transactions independently from portable terminal 100.

Display 104 is a display device for displaying an image generated by a program such as a Web browser.

Touch sensor 105 is an example of a hardware input device for inputting information such as setting values to portable terminal 100 on a Web browser.

Communication device 106 is a hardware communication interface for communicating with MFP 200 and implemented by, for example, a wireless communication circuit. Communication device 106 can communicate, for example, over two frequency bands, namely, the 2.4 GHz band and the 5 GHz band. CPU 101 controls communication device 106 as to which frequency band is used to communicate with each communication partner. CPU 101 may determine a frequency band, for example, in accordance with the communication standard input to touch sensor 105.

(MFP 200)

MFP 200 includes, as main components, a CPU 201, a ROM 202, a RAM 203, an NV-RAM 204, a storage device 205, a communication device (communication interface) 206, an operation panel 207, a scanner unit 208, a printer unit 209, and a facsimile (FAX) unit 210. CPU 201 is an example of the controller. CPU 201, ROM 202, RAM 203, NV-RAM 204, storage device 205, communication device 206, operation panel 207, scanner unit 208, printer unit 209, and FAX unit 210 are connected with each other through an internal bus.

CPU 201 is an example of the arithmetic device that executes processing for controlling the overall operation of MFP 200.

ROM 202 is an example of a non-transitory recording medium, and stores a variety of data including a program executed by CPU 201. RAM 203 functions as a work area during execution of a program in CPU 201. RAM 203 may temporarily store, for example, image data read by scanner unit 208.

NV-RAM 204 is a nonvolatile memory and retains setting values for the operation of MFP 200.

Storage device 205 stores a variety of data such as destination information registered to MFP 200 and documents. Document data may be input to MFP 200 through a network or may be generated by scanner unit 208 reading an image. Storage device 205 is implemented by a medium that stores data in a nonvolatile manner, such as EEPROM, CD-ROM, DVD-ROM, USB memory, memory card, FD, hard disk, SSD, magnetic tape, cassette tape, MO, MD, IC card (excluding memory card), optical card, and a medium that stores data in a nonvolatile manner, such as mask ROM and EPROM. Storage device 205 may be a recording medium removable from MFP 200 and subject to commercial trades independently from MFP 200.

Communication device 206 is a device for communicating with portable terminal 100 and implemented, for example, by a network card.

Operation panel 207 includes a touch sensor (input unit) and a display (display unit). Operation panel 207 displays a state of MFP 200. In addition, operation panel 207 accepts input of a variety of information (setting values of copy image quality or copy paper, destinations of scan transmission (destination registration), etc.).

Scanner unit 208 scans a set original and generates image data of the original. Known methods can be employed for generation of image data in scanner unit 208.

Printer unit 209 converts image data ready by scanner unit 208, print data transmitted from an external information processing apparatus such as portable terminal 100, and FAX data received by FAX unit 210 into data for printing, for example, by electrophotography. Printer unit 209 prints an image such as a document based on the converted data. Known techniques may be employed for image formation modes such as electrophotography or other techniques.

FAX unit 210 transfers image data read by scanner unit 208 to external equipment via a public line. Known techniques can be employed for transfer.

CPU 201 may detect the state of elements (such as scanner unit 208 and printer unit 209) in MFP 200 by executing a predetermined program. CPU 201 detect, for example, that scanner unit 208 and/or printer unit 209 is executing a job, or that a paper jam occurs in printer unit 209.

In MFP 200, communication device 206 can communicate over, for example, two frequency bands, namely, the 2.4 GHz band and the 5 GHz band. CPU 201 controls communication device 206 as to which frequency band is used to communicate with each communication partner. CPU 201 registers, for example, information for managing communication partners with the communication device 206 in storage device 205.

FIG. 3 is a diagram showing an example of information for managing communication partners with communication device 206 of MFP 200. In the table in FIG. 3, an SSID is set for each frequency band (the 2.4 GHz band and the 5 GHz band). In the present description, the information for managing communication partners as shown in the form of a table in FIG. 3 is referred to as "management table". The form of the information is not limited to a table format.

Figure 4:
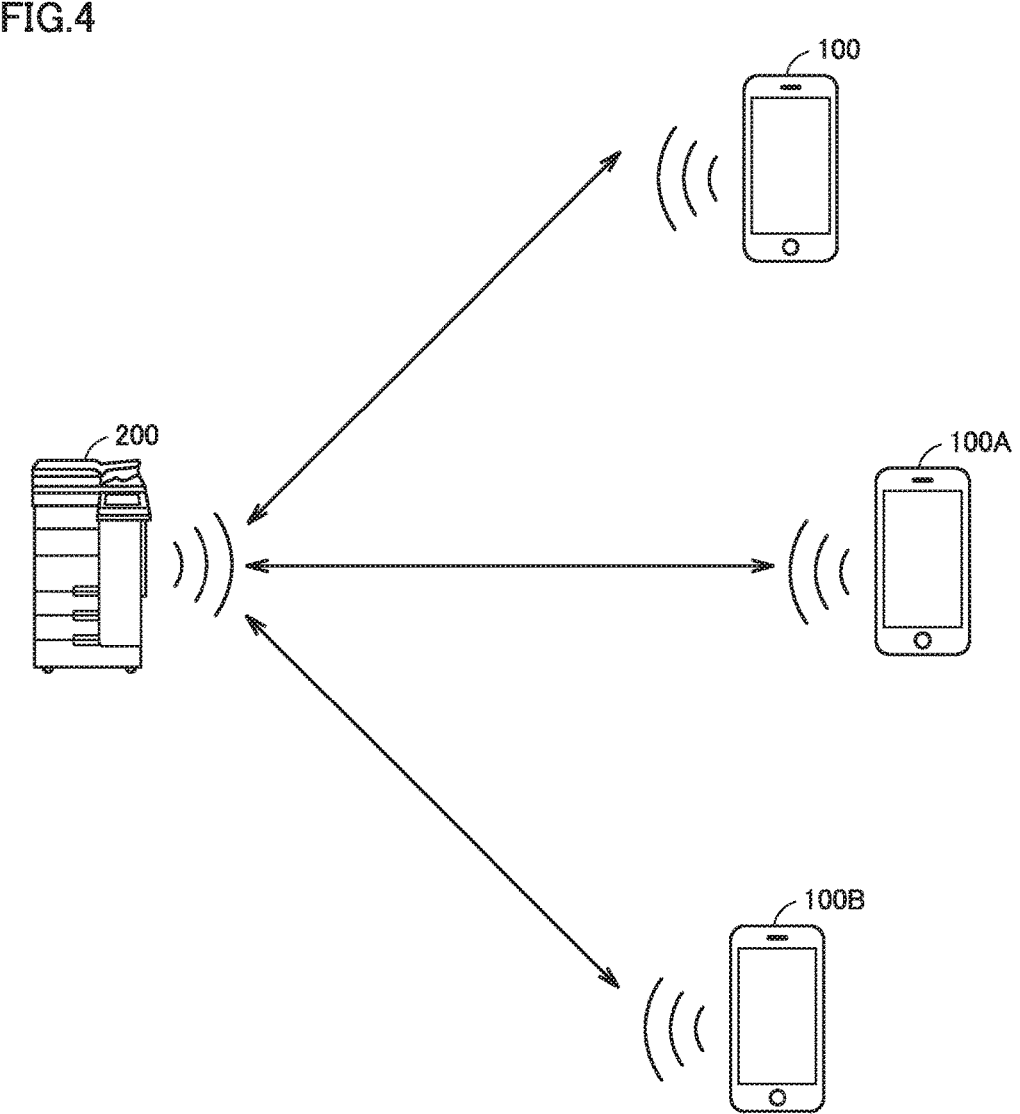
FIG. 4 is a diagram showing the MFP communicating with three portable terminals in the image forming system.

FIG. 4 is a diagram showing MFP 200 communicating with three portable terminals 100, 100A, 100B in the image forming system. As shown in the table in FIG. 3, an SSID (MFP1-SSID-01) for the 2.4 GHz band is allocated to portable terminal 100B, and an SSID (MFP1-SSID-02) for the 5 GHz band is allocated to portable terminals 100, 100A. At most five communication partners can be allocated to each of the SSID (MFP1-SSID-01) for the 2.4 band and the SSID (MFP1-SSID-02) for the 5 GHz band.

<Process Overview>

Figure 5:
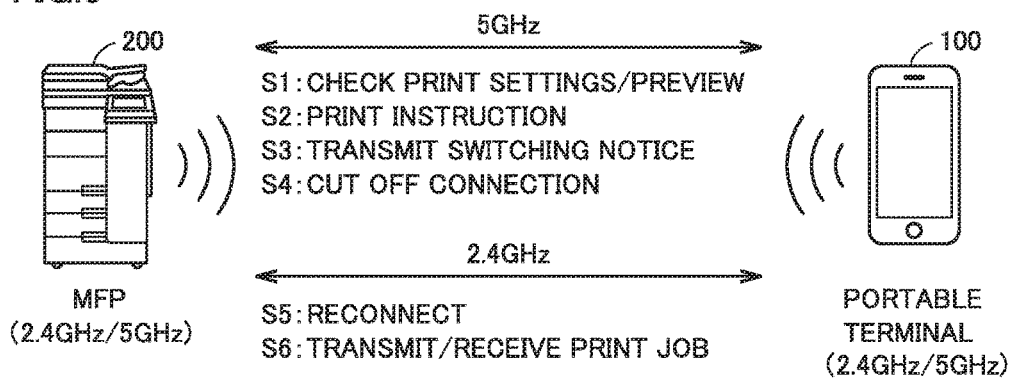
FIG. 5 is a diagram for explaining the overview of an example of the process sequence of communication related to print between the portable terminal and the MFP in the image forming system.

FIG. 5 is a diagram for explaining the overview of an example of the process sequence of communication related to print between portable terminal 100 and MFP 200 in the image forming system. In this example, the frequency band used for communication between portable terminal 100 and MFP 200 is switched from the 5 GHz band to the 2.4 GHz band. In FIG. 5, steps S1 to S6 are shown as general steps. Each step will be described below.

The communication in steps S1 to S4 is performed over the 5 GHz band. Step S1 shows communication for checking print setting and a preview screen at portable terminal 100. The communication in step S1 includes, for example, a request for the contents of settings from portable terminal 100 to MFP 200, transmission of the contents of settings from MFP 200 to portable terminal 100, a request for a preview screen from portable terminal 100 to MFP 200, and/or transmission of a preview screen from MFP 200 to portable terminal 100.

Step S2 shows transmission of a print job from portable terminal 100 to MFP 200. Step S3 shows transmission of a notice of switching of the frequency band of communication. In the communication in step S3, MFP 200 notifies portable terminal 100 of switching of the frequency band, for example, in response to a condition for switching the frequency band from the 5 GHz band being satisfied. With this notice, MFP 200 transmits switching information to portable terminal 100. The switching information includes the SSID for the frequency band after switching (an empty one of SSIDs for the 2.4 GHz band). The notice may further include information (for example, command) to give an instruction for switching the frequency band.

After that, in step S4, MFP 200 disconnects the communication with portable terminal 100.

The communication in steps S5 to S6 is performed over the 2.4 GHz band. Step S5 shows reconnection between portable terminal 100 and MFP 200 over the 2.4 band. This reconnection includes, for example, that portable terminal 100 transmits a request for reconnection to MFP 200 using the SSID included in the switching information received from MFP 200.

Step S6 includes transmission of data of a print job from portable terminal 100 to MFP 200 over the 2.4 GHz band.

In the example shown in FIG. 5, portable terminal 100 starts transmission of a print job over the 5 GHz band and thereafter changes the frequency band for transmission of the print job to the 2.4 GHz band.

<Process Flow>

Figure 6:
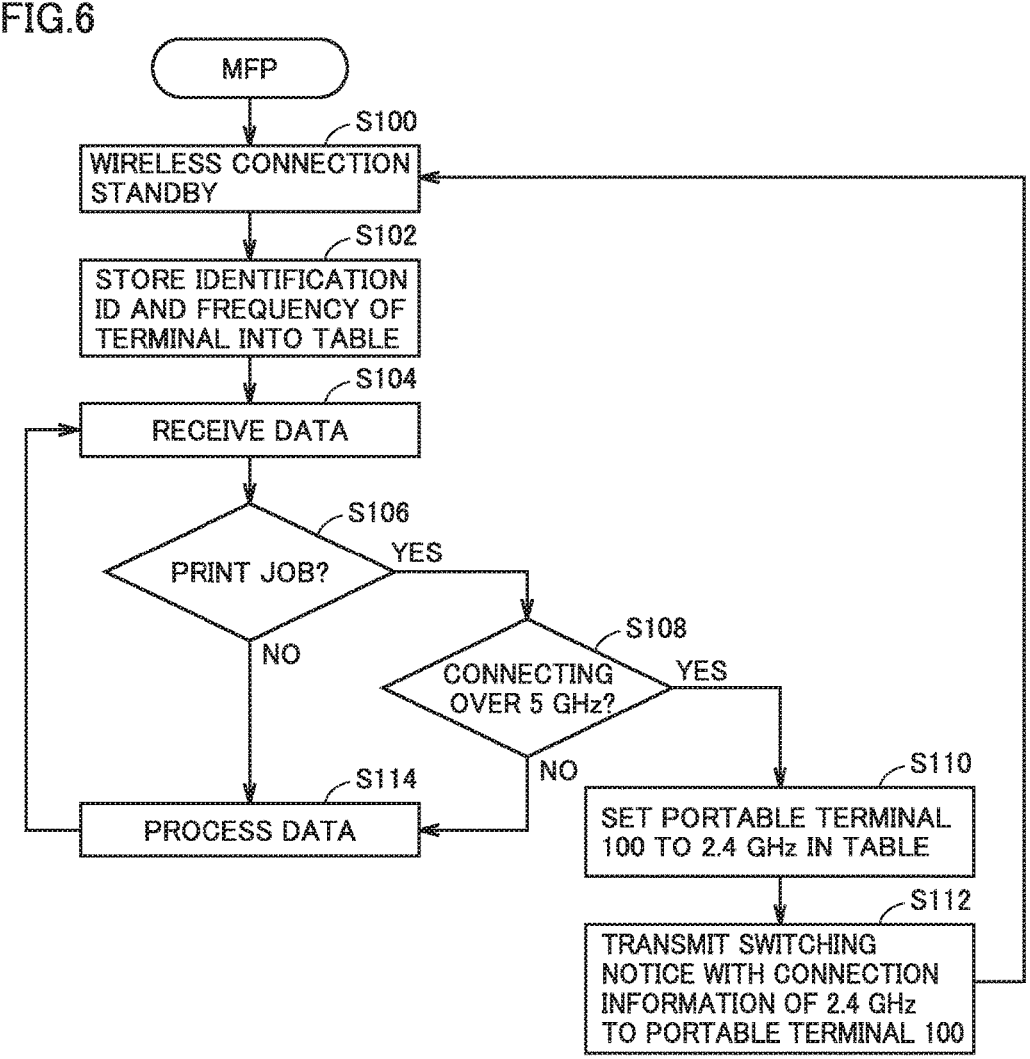
FIG. 6 shows an example of the process executed in the MFP for implementing the process shown in FIG. 5.

FIG. 6 is an example of the process executed by CPU 201 of MFP 200 for implementing the process shown in FIG. 5. CPU 201 implements the process in FIG. 6 by executing a program stored in, for example, ROM 202 (FIG. 2).

As shown in FIG. 6, in step S100, CPU 201 moves to a connection standby state for wireless communication using communication device 206.

In step S102, CPU 201 stores the identification ID and the frequency band of a communication partner into the management table (for example, FIG. 3).

In step S104, CPU 201 receives data through communication device 106. In step S106, CPU 201 determines whether the data received in step S104 is a print job. If CPU 201 determines that the received data is a print job, the control proceeds to step S108. If CPU 201 determines that it is not a print job, the control proceeds to step S114.

In step S108, CPU 201 determines whether the frequency band of communication with the communication partner from which data is received in step S104 is the 5 GHz band. If CPU 201 determines that the frequency band is the 5 GHz band, the control proceeds to step S110. If CPU 201 determines that it is not the 5 GHz band (for example, the 2.4 GHz band), the control proceeds to step S114.

In step S110, CPU 201 sets the communication partner (in FIG. 6, "portable terminal 100") as the communication partner over the 2.4 GHz band in the management table. That is, CPU 201 changes the frequency band associated with communication partner from the 5 GHz band to the 2.4 GHz band. The control then proceeds to step S112.

FIG. 7 is a diagram for explaining an example of changing the contents of the management table. In step S110, the management table is changed, for example, from the state in FIG. 3 to the state in FIG. 7. That is, in FIG. 3, "portable terminal 100" is set to the 5 GHz band. In FIG. 7, the setting of "portable terminal 100" to the 5 GHz band is cleared and the 2.4 GHz band is set.

Before the changing (FIG. 3), two terminal (portable terminals 100, 100A) are set to the 5 GHz band, and one terminal (portable terminal 100B) is set to the 2.4 GHz band. In other words, the 5 GHz band has three vacancies, and the 2.4 GHz band has four vacancies. On the other hand, after the changing (FIG. 7), one terminal (portable terminal 100A) is set to the 5 GHz band, and two terminal (portable terminals 100A, 100B) are set to the 2.4 GHz band. In other words, the 5 GHz band has four vacancies, and the 2.4 GHz band has three vacancies.

Returning to FIG. 6, in step S112, CPU 201 transmits connection information of the 2.4 band (for example, the SSID for the 2.4 GHz band) and a switching notice to the communication partner from which data is received in step S104. The control then returns to step S100. In step S112, CPU 201 may disconnect communication with the communication partner from which data is received in step S104.

In step S114, CPU 201 returns to step S104 after processing the data. In step S114, the communication is maintained without changing the frequency band of communication.

In the image forming system as described above, if the content of communication with portable terminal 100 satisfies a predetermined condition, MFP 200 executes control for switching the frequency band for use in communication with portable terminal 100. For example, in the process in FIG. 6, when a print job is received, CPU 201 of MFP 200 changes the frequency band of communication with the sender of the print job from the 5 GHz band to the 2.4 GHz band. This allow portable terminal 100 to communicate with MFP 200 over the 2.4 GHz band. The frequency band used for transmission of the print job is changed from the 5 GHz band to the 2.4 GHz band.

Because of the switching of frequency band from the 5 GHz to the 2.4 GHz band, the frequency band of communication between portable terminal 100 and MFP 200 is switched to the one with lower communication speed. Thus, in MFP 200, the number of empty SSIDs for the frequency band with higher communication speed (5 GHz band) can be increased.

Because of the switching of frequency band from the 5 GHz band to the 2.4 GHz band, the frequency band of communication between portable terminal 100 and MFP 200 is switched to the one with lower communication stability. Thus, in MFP 200, the number of empty SSIDs for the frequency band (5 GHz band) with higher communication stability can be increased.

<Changing Allocation of SSIDs>

Figure 8:
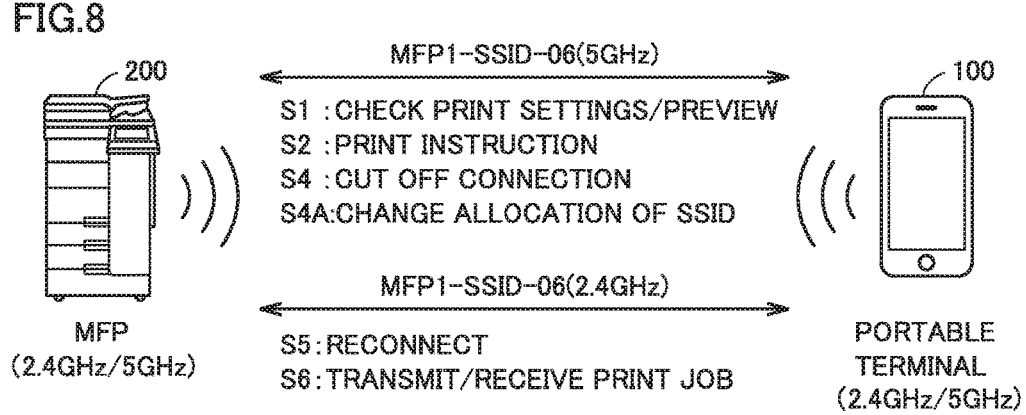
FIG. 8 is a diagram showing an example of the process sequence of communication in the image forming system in the present disclosure.

In the image forming system, when the frequency band for use in communication with portable terminal 100 is changed. MFP 200 may change the frequency band associated with the SSID for use in communication with portable terminal 100, rather than changing the SSID for use in communication with portable terminal 100. FIG. 8 is a diagram showing an example of the process sequence of communication in the image forming system in the present disclosure.

Steps S1, S2, and S4 to S6 in FIG. 8 are executed in the same manner as steps S1, S2, and S4 to S6 in FIG. 5. The process sequence in FIG. 8 does not include step S3 in FIG. 5 but includes step S4A. More specifically, in the process sequence in FIG. 8, CPU 201 of MFP 200 disconnects communication with portable terminal 100 in step S4 after receiving a print job in step S2.

In step S4A, CPU 201 changes the allocation of the SSID in the management table. With this change, the frequency band associated with the SSID allocated to portable terminal 100 is changed from the 5 GHz band to the 2.4 GHz band. The changing of allocation of the SSID will be described later with reference to FIGS. 9 and 10.

CPU 101 of portable terminal 100 requests reconnection from MFP 200. In accordance with the request, in step S5, portable terminal 100 and MFP 200 are reconnected. Since the contents of the management table have been changed in step S4A, in step S5, portable terminal 100 and MFP 200 communicate over the 2.4 GHz band.

In the process sequence shown in FIG. 8, the frequency band for use in communication is changed without changing the SSID for use in communication between portable terminal 100 and MFP 200.

Referring to FIGS. 9 and 10, the changing of allocation of SSIDs in the management table will be described. FIGS. 9 and 10 are diagrams for explaining the changing of allocation of SSIDs in MFP 200 in step S4A. In FIGS. 9 and 10, the management table stored in MFP 200 is shown.

FIG. 9 shows the allocation of SSIDs before changing. In FIG. 9, five SSIDs (MFP1-SSID-01 to 05) are allocated to the 2.4 GHz band, and five SSIDs (MFP1-SSID-06 to 10)

are allocated to the 5 GHz band. One of the SSIDs (MFP1-SSID-06) in the 5 GHz band is allocated to portable 100.

FIG. 10 shows the allocation of SSIDs after changing. Compared with FIG. 9, in FIG. 10, the frequency band associated with the SSID (MFP1-SSID-06) is changed from the 5 GHz band to the 2.4 GHz band. The SSID (MFP1-SSID-06) has been allocated to portable terminal 100 in FIG. 9. In FIG. 10, the SSID (MFP1-SSID-06) is allocated to the 2.4 GHz band whereby the SSID (MFP1-SSID-02) is detected. MFP 200 further generates a new SSID (MFP1-SSID-11) for the 5 GHz band.

FIG. 11 is a flowchart of the process executed by CPU 201 of MFP 200 in the process sequence including changing of allocation of SSIDs.

The flowchart in FIG. 11 includes steps S120 and S122. Compared with the flowchart in FIG. 6, in the flowchart in FIG. 11, if it is determined that a print job has been received in step S106 and it is determined that connection is in progress over the 5 GHz band in step S108, CPU 201 proceeds to step S120.

In step S120, CPU 201 disconnects the communication with the communication partner from which a print job has been received. The control then proceeds to step S122.

In step S122, CPU 201 allocates the SSID used for communication with the communication partner from which a print job has been received, to the 2.4 GHz band in the management table (see FIGS. 9 and 10).

<Communication Relation with Plurality of Communication Partners>

In the image forming system, MFP 200 can communicate concurrently with a plurality of communication partners. "Concurrently" means, for example, that two or more communication partners are registered in the management table (for example, FIG. 3). When the content of communication with a first communication partner satisfies a predetermined condition, CPU 201 of MFP 200 may execute control for switching the frequency band of communication with a second communication partner.

FIG. 12 is a diagram showing an example of the process sequence in the image forming system. FIG. 12 shows five steps (1) to (5). In the image forming system in FIG. 12 MFP 200 communicates with two portable terminals (portable terminals 100, 100A).

In step (1), portable terminal 100A transmits a print job to MFP 200 over the 5 GHz band.

In step (2), MFP 200 executes the job received from portable terminal 100A. More specifically, MFP 200 executes an image forming operation in accordance with the job.

In step (3), portable terminal 100 starts transmission of a print job to MFP over the 5 GHz band.

In step (4), MFP 200 determines whether the state of MFP 200 is in a certain state. The certain state includes a state in which the image forming operation is in progress. MFP 200 is executing the image forming operation for the print job received from portable terminal 100A. In response, MFP 200 executes control for switching the frequency band for use in communication for receiving a print job from portable terminal 100, from the 5 GHz band to the 2.4 GHz band. An example of the control for switching the frequency band includes a notice of the SSID for the 2.4 GHz band, as explained with reference to FIG. 5. Another example is to change the correspondence between the SSID and the frequency band, as explained with reference to FIGS. 9 and 10.

In accordance with the control in step (4), in step (5), MFP 200 and portable terminal 100 communicate over the 2.4 band. The transmission of a print job (print data) from portable terminal 100 to MFP 200 is thus performed over the 2.4 GHz band.

FIG. 13 is a flowchart of the process executed by CPU 201 of MFP 200 in the process sequence (FIG. 12) including changing the frequency band in accordance with the state of MFP 200.

Compared with the flowchart in FIG. 6, the flowchart in FIG. 13 includes step S109. The flowchart in FIG. 13 is related to communication with portable terminal 100 (portable terminal 100 that has transmitted a print job later) in FIG. 12.

If CPU 201 determines that a print job has been received from portable terminal 100 in step S106, the control proceeds to step S108. In step S108, CPU 201 determines whether the frequency band for connecting with portable terminal 100 is the 5 GHz band. If it is determined that connection with portable terminal 100 is in progress over the 5 GHz band, CPU 201 proceeds to step S109.

In step S109, CPU 201 determines whether the state of MFP 200 is that the print job is being executed. If CPU 201 determines that the state of MFP 200 is that the print job is being executed, the control proceeds to step S110. If CPU 201 determines that the print job is not being executed, the control proceeds to step S114. In step S110 (and step S112), CPU 201 executes control for changing the frequency band of communication with portable terminal 100. In step S114, CPU 201 processes data received from portable terminal 100.

<Switching of Frequency Band According to State of Application in Portable Terminal>

Figure 14:
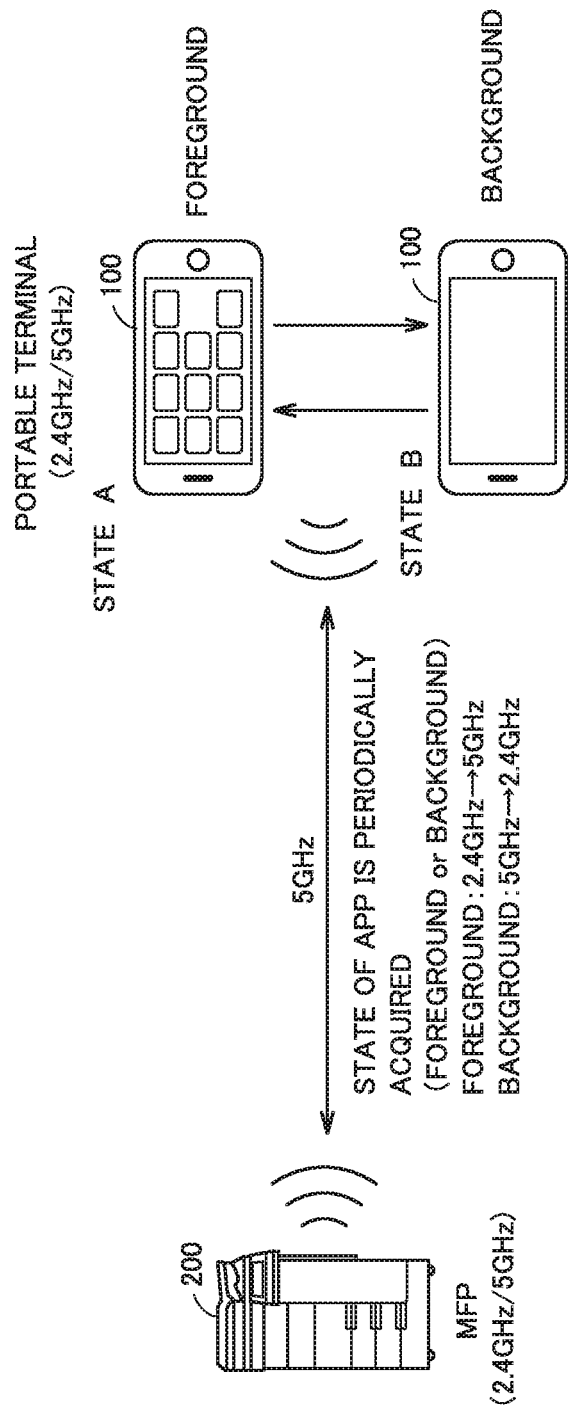
FIG. 14 is a diagram for explaining an example of the process sequence executed in the image forming system.

FIG. 14 is a diagram for explaining an example of the process sequence executed in the image forming system. In the example shown in FIG. 14, MFP 200 communicates with portable terminal 100. An application for controlling the operation of MFP 200 is installed in portable terminal 100. In FIG. 14, two states A and B are shown for portable terminal 100.

In state A, the application is active. That is, CPU 101 of portable terminal 100 is executing the application in the foreground. Thus, display 104 of portable terminal 100 is displaying a window of the application.

In state B, the application is non-active. That is, CPU 101 of portable terminal 100 is executing the application in the background.

CPU 101 periodically transmits information indicating the state of the application to MFP 200. The state included in the transmitted information is, for example, either foreground (execution) or background (execution).

CPU 201 of MFP 200 controls the frequency band for use in communication between MFP 200 and portable terminal 100, in accordance with the state of the application indicated by the information transmitted from portable terminal 100. More specifically, when the state of the application is foreground, CPU 201 uses the 5 GHz band for the communication with portable terminal 100. When the state of the application is background CPU 201 uses the 2.4 GHz band for the communication with portable terminal 100.

Figure 15:
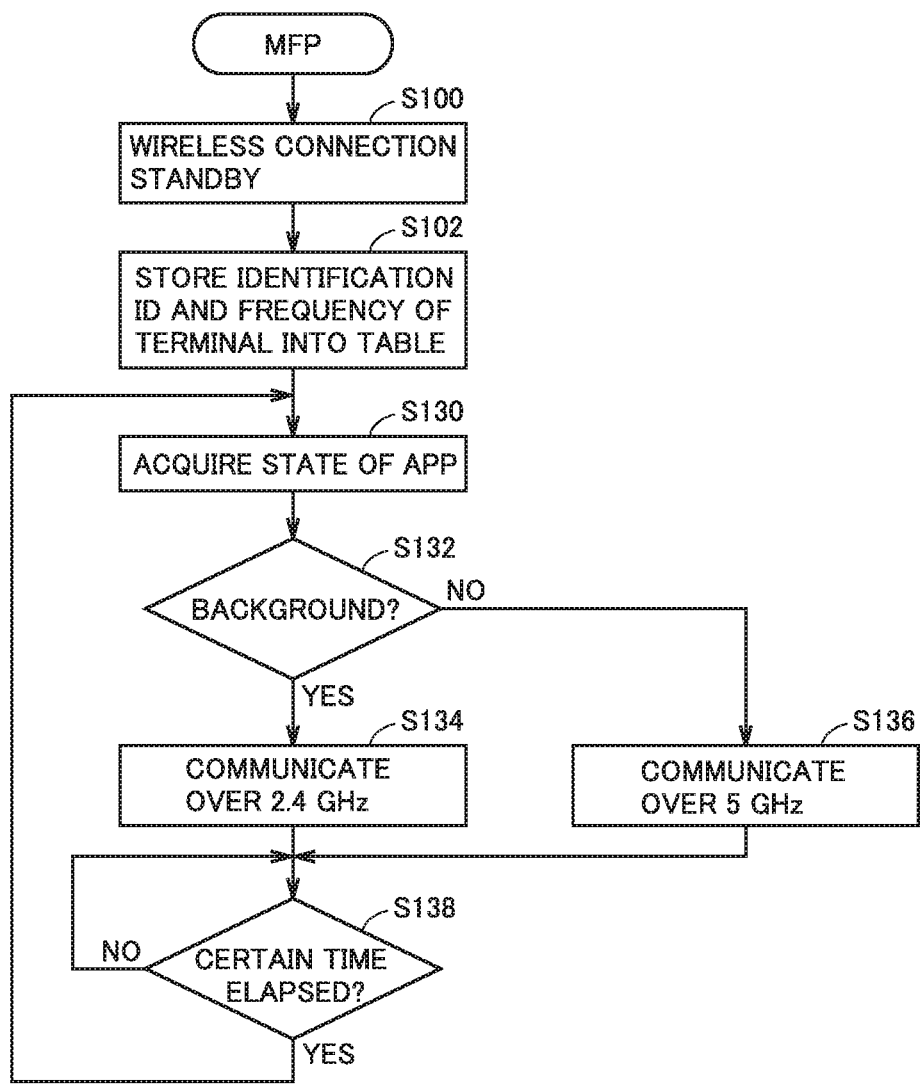
FIG. 15 is a flowchart of an example of the process executed in the image forming system.

FIG. 15 is a flowchart of an example of the process executed by CPU 201 of MFP 200 in the image forming system.

As shown in FIG. 15, after CPU 201 executes steps S100 and S102 as explained with reference to FIG. 6, the control proceeds to step S130.

In step S130, CPU 201 acquires the state of the application from portable terminal 100. In an example, the acquisition of the state is implemented by periodical transmission of information from portable terminal 100 to MFP 200. In another example, CPU 201 of MFP 200 requests portable terminal 100 to transmit the state of the application. In response to the request, CPU 101 of portable terminal 100 transmits information indicating the state of the application to MFP 200. CPU 201 receives the information to acquire the state of the application. The control then proceeds to step S132.

In step S132, CPU 201 determines whether the acquired state of the application is background. If the acquired state is background, CPU 201 proceeds to step S134. If the acquired state is foreground, the control proceeds to in step S136.

In step S134, CPU 201 communicates with portable terminal 100 over the 2.4 GHz band. If MFP 200 and portable terminal 100 have already communicated over the 2.4 GHz band, CPU 201 proceeds to step S138 without executing any control. If MFP 200 and portable terminal 100 are communicating over the 5 GHz band. CPU 201 executes control for changing the frequency band for use in communication to the 2.4 GHz band (for example, FIG. 5) and the proceeds to step S138.

In step S136, CPU 201 communicates with portable terminal 100 over the 5 GHz band. If MFP 200 and portable terminal 100 have already communicated over the 5 GHz band, CPU 201 proceeds to step S138 without executing any control. If MFP 200 and portable terminal 100 are communicating over the 2.4 GHz band. CPU 201 executes control for changing the frequency band for use in communication to the 5 GHz band and then proceeds to step S138.

In step S138, CPU 201 determines whether a certain time has elapsed since the state of the application is acquired in step S130. If it is determined that a certain time has elapsed, the control returns to step S130. Thus, step S130 is executed at regular intervals.

<Switching of Frequency Band According to Vacancy in Management Table>

FIG. 16 is a flowchart of an example of the process executed in MFP 200 in the image forming system. In the process in FIG. 16, if the content of communication with portable terminal 100 satisfies a predetermined condition, MFP 200 switches the frequency band for use in communication with portable terminal 100, according to the number of vacancies in each frequency band in the management table (for example, FIG. 3).

The process in FIG. 16 is executed to control the frequency band in communication with portable terminal 100. Compared with FIG. 6, the flowchart in FIG. 16 includes steps S140 to S146 instead of steps S110 to S112.

As shown in FIG. 16, if CPU 201 determines that communication with portable terminal 100 is in progress over the 5 GHz band in step S108 (YES in step 108), the control proceeds to step S140.

In step S140, CPU 201 checks the connection condition of each of the 2.4 GHz band and the 5 GHz band in the management table. For example, CPU 201 acquires the number of devices connected for each of the 2.4 GHz band and the 5 GHz band in the management table. The control then proceeds to step S142.

In step S142, CPU 201 determines whether the number of devices unconnected (vacancies) for the 2.4 GHz band is larger than the number of devices unconnected for the 5 GHz band. "The number of devices unconnected" is the number obtained by subtracting the number of devices connected from the largest possible number of devices connected. For example, as for the 5 GHz band in the management table shown in FIG. 3, the largest possible number of devices connected is "five" and the number of devices connected is "two" (portable terminals 100 and 100A). In this case, therefore, the number of devices unconnected is "three".

In step S142, if CPU 201 determines that the number of devices unconnected for the 2.4 GHz band is larger than the number of devices unconnected for the 5 GHz band, the control proceeds to step S144. If it is determined that the number of devices unconnected for the 2.4 GHz band is equal to or smaller than the number of devices unconnected for the 5 GHz band, the control proceeds to step S114.

In step S144, CPU 201 cuts off the connection with portable terminal 100. The control then proceeds to step S146.

In step S146, CPU 201 changes the contents of the management table as explained with reference to FIGS. 9 and 10. That is, CPU 201 deletes one of the SSIDs associated with the 2.4 GHz band, makes a change so that the SSID that has been used in communication over the 5 GHz so far is associated with the 2.4 GHz band, and generates one new SSID to be associated with the 5 GHz band. The control then returns to step S100. Thus, in the image forming system, portable terminal 100 requests communication over the 2.4 GHz band from MFP 200. After that, MFP 200 communicates with portable terminal 100 over the 2.4 GHz band. If the content of communication between portable terminal 100 and MFP 200 satisfies the condition for changing the frequency band to the 5 GHz band, MFP 200 executes control for changing the frequency band of communication with portable terminal 100 to the 5 GHz band.

SUMMARY OF DISCLOSURE

In the image processing apparatus in the present disclosure, the control for switching a frequency band of communication by the communication interface to another frequency band of a plurality of frequency bands may include transmitting a notice of switching of a frequency band of communication to a communication partner.

The image forming apparatus may further include a memory configured to store a frequency band of communication and identification information associated with each communication partner with the communication interface. The control for switching a frequency band of communication by the communication interface to another frequency band of the frequency bands may include updating stored content in the memory such that identification information associated with the communication partner for which a frequency band of communication is to be switched is associated with another frequency band in the memory.

The condition for switching a frequency band of communication by the communication interface may be that data received by the communication interface includes a print job. The controller may be configured to execute the control for switching a frequency band of communication by the communication interface to another frequency band of the frequency bands when the content of communication of the communication interface satisfies the condition and, in addition, when an operating state of the image forming apparatus is in a certain state.

The control for switching a frequency band of communication by the communication interface to another frequency band of the frequency bands may include control for switching a frequency band of communication by the communication interface to one with higher communication speed, or may include control for switching a frequency band of communication by communication interface to one with higher communication stability, or may include control for switching a frequency band of communication by the communication interface to one with lower communication speed, or may include control for switching a frequency band of communication by the communication interface to one with lower communication stability.

The condition for switching a frequency band of communication by the communication interface may be that data received by the communication interface includes data indicating a state of an application for operating the image forming apparatus in a communication partner. The state of the application may be an active state or a non-active state.

The control for switching a frequency band of communication by the communication interface may include control for a switching a frequency band of communication by the communication interface to one with higher communication speed when the state of the application is an active state, and may include control for switching a frequency band of communication by the communication interface to one with lower communication speed when the state of the application is a non-active state.

The control for switching a frequency band of communication by the communication interface may include control for switching a frequency band of communication by the communication interface to one with higher communication stability when the state of the application is an active state, and may include control for switching a frequency band of communication by the communication interface to one with lower communication stability when the state of the application is a non-active state.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:
    a hardware communication interface capable of communication over a plurality of frequency bands; and
    a hardware controller configured to determine whether content of communication, received from a remote computing device via the hardware communication interface, satisfies a predetermined condition, wherein the hardware controller is configured to execute control for switching a frequency band of communication via the hardware communication interface to another frequency band of the plurality of frequency bands when the content of communication of the hardware communication interface satisfies the predetermined condition.

2. The image forming apparatus according to claim 1, wherein the control for switching includes transmission of a notice of switching a frequency band of communication to a communication partner.

3. The image forming apparatus according to claim 1, further comprising a memory configured to store a frequency band of communication and identification information associated with each communication partner with the hardware communication interface, wherein
    the control for switching includes updating stored content in the memory such that identification information associated with a communication partner for which a frequency band of communication is to be switched is associated with another frequency band in the memory.

4. The image forming apparatus according to claim 1, wherein the predetermined condition is that data received by the hardware communication interface includes a print job.

5. The image forming apparatus according to claim 1, wherein the hardware controller is configured to execute the control when the content of communication of the hardware communication interface satisfies the predetermined condition and when an operating state of the image forming apparatus is in a certain state.

6. The image forming apparatus according to claim 1, wherein the control for switching includes control for switching a frequency band of communication by the hardware communication interface to a frequency band with higher communication speed.

7. The image forming apparatus according to claim 1, wherein the control for switching includes control for switching a frequency band of communication by the hardware communication interface to a frequency band with higher communication stability.

8. The image forming apparatus according to claim 1, wherein the control for switching includes control for switching a frequency band of communication by the hardware communication interface to a frequency band with lower communication speed.

9. The image forming apparatus according to claim 1, wherein the control for switching includes control for switching a frequency band of communication by the hardware communication interface to a frequency band with lower communication stability.

10. The image forming apparatus according to claim 1, wherein the predetermined condition is that data received by the hardware communication interface includes data indicating a state of an application for operating the image forming apparatus in a communication partner.

11. The image forming apparatus according to claim 10, wherein the state of the application is an active state or a non-active state.

12. The image forming apparatus according to claim 10, wherein
    the control for switching includes:
    control for switching a frequency band of communication by the hardware communication interface to a frequency band with higher communication speed when the state of the application is an active state; and
    control for switching a frequency band of communication by the hardware communication interface to a frequency band with lower communication speed when the state of the application is a non-active state.

13. The image forming apparatus according to claim 10, wherein
    the control for switching includes:
    control for switching a frequency band of communication by the hardware communication interface to a frequency band with higher communication stability when the state of the application is an active state; and
    control for switching a frequency band of communication by the hardware communication interface to a frequency band with lower communication stability when the state of the application is a non-active state.

14. The image forming apparatus according to claim 1, wherein the content of communication is content of a message.

15. A non-transitory recording medium encoded with a program executed by a computer of an image forming apparatus including a hardware communication interface capable of communication over a plurality of frequency bands,
    the program causing the computer to execute:

allowing the hardware communication interface to execute communication with a remote computing device over one frequency band of the plurality of frequency bands;

determining whether content of communication, received from the remote computing device, satisfies a predetermined condition; and when content of communication of the hardware communication interface satisfies the predetermined condition, executing control for switching a frequency band of communication with the remote computing device to another frequency band of the plurality of frequency bands.

16. The non-transitory recording medium according to claim 15, wherein the content of communication is content of a message.

17. An image forming system comprising an information terminal and an image forming apparatus configured to communicate with the information terminal, the image forming apparatus including
a first hardware communication interface capable of communication over a plurality of frequency bands, and
a first hardware controller configured to determine whether content of communication, received from the information terminal by the first hardware communication interface, satisfies a predetermined condition, the first hardware controller being configured to give a notice of switching of a frequency band of communication to the information terminal when the content of communication satisfies the predetermined condition, the information terminal including
a second hardware communication interface capable of communication over a plurality of frequency bands, and
a second hardware controller configured to control communication of the second hardware communication interface, the second hardware controller being configured to allow the second hardware communication interface to communicate with the first hardware communication interface over another frequency band in response to receiving the notice from the image forming apparatus.

18. The image forming system according to claim 17, wherein the content of communication is content of a message.

* * * * *